United States Patent
Biaud

(10) Patent No.: US 11,564,455 B2
(45) Date of Patent: Jan. 31, 2023

(54) CAM BUCKLE

(71) Applicant: Axel Johnson International AB, Stockholm (SE)

(72) Inventor: Richard Biaud, Mions (FR)

(73) Assignee: AXEL JOHNSON INTERNATIONAL AB, Stockholm (SE)

( * ) Notice: Subject to any disclaimer, the term of this patent is extended or adjusted under 35 U.S.C. 154(b) by 0 days.

(21) Appl. No.: 17/490,361

(22) Filed: Sep. 30, 2021

(65) Prior Publication Data
US 2022/0104589 A1  Apr. 7, 2022

(30) Foreign Application Priority Data
Oct. 7, 2020  (EP) ..................................... 20200525

(51) Int. Cl.
*A44B 11/12*  (2006.01)
*B60P 7/08*  (2006.01)

(52) U.S. Cl.
CPC .......... *A44B 11/125* (2013.01); *B60P 7/0838* (2013.01)

(58) Field of Classification Search
CPC . A44B 11/125; A44B 11/065; A44B 11/2557; A44B 11/2553; A44B 11/006; B60P 7/0838; B60P 7/0823
See application file for complete search history.

(56) References Cited

U.S. PATENT DOCUMENTS

| 4,858,283 A | 8/1989 | Takeuchi |
| 10,682,944 B2 * | 6/2020 | Van Boxtel ........... F16B 45/021 |
| 2010/0064489 A1 | 3/2010 | Hanson |
| 2017/0065033 A1 * | 3/2017 | Sloan ................... A44B 11/006 |

FOREIGN PATENT DOCUMENTS

| WO | WO 2014/154947 | 10/2014 |
| WO | WO 2016/064272 | 4/2016 |

OTHER PUBLICATIONS

Extended European Search Report from EP Application No. 20200525.2, dated Mar. 19, 2021.

* cited by examiner

*Primary Examiner* — Robert Sandy
(74) *Attorney, Agent, or Firm* — Westman, Champlin & Koehler, P.A.

(57) ABSTRACT

A buckle for fastening a load strap, comprising a buckle frame, a crossbar extending between side arms of the frame, and a pivotable cam arranged between the side arms. The crossbar forms part of a locking element, which is displaceable between a closed position, in which the crossbar extends between the side arms, and an open position, in which the crossbar is separated from at least one of the side arms, such that a load strap is laterally insertable between the cam and the crossbar.
The displaceable locking element may provide great ease of access for laterally inserting a load strap. The integrity of the buckle frame is maintained, increasing the stiffness of the buckle and its ability to withstand tension from a load strap.

6 Claims, 5 Drawing Sheets

CAM BUCKLE

CROSS-REFERENCE TO RELATED APPLICATION

This application claims priority to European Patent Application No. 20200525.2, filed Oct. 7, 2020, the content of which is hereby incorporated by reference in its entirety.

TECHNICAL FIELD

The present disclosure relates to the field of cam buckles for fastening load straps.

BACKGROUND

Cam buckles are commonly used for fastening load straps when securing cargo or equipment. Typically, one end of the strap is coupled to the buckle, the strap placed around the cargo, and the free end of the strap threaded into the buckle. Pulling the excess strap through the buckle provides the necessary tension to secure the cargo. The cam locks the strap in place, preventing it from slipping back through the buckle, thus keeping the cargo secured.

Threading the free end of the strap into the buckle can be difficult and requires some dexterity. For example, the end of the strap may be frayed, making it difficult to thread into the buckle without causing further damage. Depending on the dimensions of the strap and buckle, the operation can be very difficult to perform while wearing gloves. Pulling the excess strap through the buckle is also time consuming. In particular, if the cargo to be secured is small, the length of strap that needs to be pulled through the buckle in order to achieve the necessary tension can be significant.

WO 2014/154947 A1 and WO 2016/064272 A1 disclose buckles allowing a strap to be inserted laterally, by way of an opening or slot in a sidewall or arm of the buckle frame, thus eliminating the need to thread the strap into the buckle. The opening mechanisms can however be difficult to manipulate. Additionally, these solutions may come with a loss of stiffness, increasing the risk of the buckles deforming under load.

SUMMARY OF THE INVENTION

In light of the above, it is an object of the present disclosure to alleviate at least some of the drawbacks and to provide an improved cam buckle that allows for quick and easy operation.

The invention is defined by the appended independent claim, with embodiments being set forth in the appended dependent claims, in the following description, and in the drawings.

According to an aspect of the invention, there is provided a buckle for fastening a load strap, comprising a buckle frame having two substantially parallel side arms, and a crossbar extending between the side arms along a main axis, the main axis being substantially perpendicular to the side arms. A cam is arranged between the side arms, the cam being pivotable between a clamping position, in which a load strap inserted between a gripping portion of the cam and the crossbar is clamped, and a release position, in which a clearance between the gripping portion and the crossbar is increased. The buckle is characterized in that the crossbar forms part of a locking element which is displaceable between a closed position, in which the crossbar extends between the side arms such that a load strap positioned between the cam and the crossbar is laterally constrained by the side arms, and an open position, in which the crossbar is separated from at least one of the side arms, such that a load strap is laterally insertable between the cam and the crossbar.

The present invention is at least partly based on the realization that displacing the locking element may provide great ease of access for laterally inserting a load strap. The integrity of the buckle frame is maintained, increasing the stiffness of the buckle and its ability to withstand tension from a load strap.

In some embodiments, the locking element is displaceable such that the main axis of the crossbar remains perpendicular to the side arms during a displacement between the closed position and the open position of the locking element. This allows the crossbar to be aligned with the load strap irrespective of the position of the locking element. For instance, in the open position of the locking element, the load strap may be placed in contact with the crossbar and guided into a correct position in the buckle by the displacement from the open position to the closed position of the locking element.

The locking element may further be pivotably connected to a side arm and pivotably displaceable between the closed position and the open position of the locking element. This provides a reliable and precise mechanism for displacing the locking element, making it very easy to manipulate reliably.

Such a pivotable locking element may comprise an attachment arm extending between an end portion of the crossbar and an attachment portion pivotably connected to a side arm of the buckle frame, such that the pivot axis of the locking element is parallel to but offset with respect to the main axis of the crossbar. Such a construction provides a compact buckle while allowing for easy access for laterally inserting the load strap.

Alternatively, the locking element may be displaceable by translation along a direction perpendicular to the main axis of the crossbar.

In another alternative, the locking element may be slidably displaceable along its main (longitudinal) axis.

In some embodiments, each side arm may comprise an abutment adapted to engage a respective end portion of the crossbar, in the closed position of the locking element, and the locking element may be locked in the closed position by the cam when the cam is in the clamping position. This allows the abutments to determine the location of the crossbar, relative to the buckle frame, when the locking element is in the closed position. It ensures that a tension force transferred to the crossbar from a load strap in tension can be effectively transferred to the buckle frame. It further ensures that a clamped load strap can only be released by pivoting the cam from its clamping position to its release position.

The buckle may further comprise a biasing element, biasing the cam toward the clamping position. This reduces the risk of accidentally releasing a clamped load strap and/or displacing the locking element from its closed position to its open position.

The buckle frame may further comprise a second crossbar fixedly connecting the side arms of the buckle frame, the second crossbar forming an anchor for attaching one end of a load strap. This increases the stiffness of the buckle frame. Additionally, it allows for different ways to attach a load strap, such as sewing an end of the load strap around the crossbar or using a hook connected to the load strap.

BRIEF DESCRIPTION OF THE DRAWINGS

The invention, some non-limiting embodiments and further advantages will now be further described with reference to the drawings, in which.

DETAILED DESCRIPTION OF THE DRAWINGS

Figure 1:
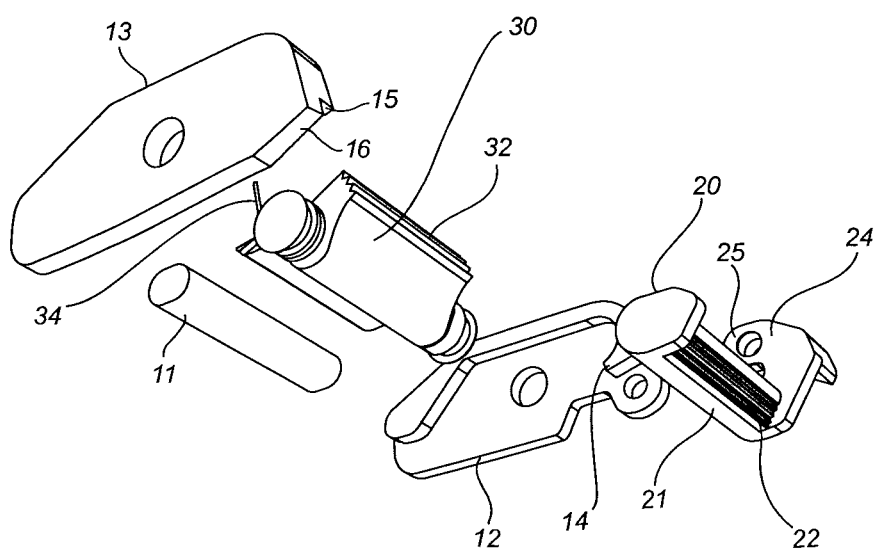
FIG. 1 shows an exploded view of an embodiment of the cam buckle

FIGS. 1-4 show an embodiment of a cam buckle 1 for fastening a load strap according to an aspect of the present invention. The cam buckle 1 comprises a pivotable cam 30 and a crossbar 21 forming part of a pivotably displaceable locking element 20. The cam 30 and locking element 20 are pivotably connected to a U-shaped buckle frame 10 which is made of two parallel side arms 12, 13 connected by a second crossbar 11. The two side arms 12, 13 are thin plates of similar dimensions, generally aligned and facing each other, with the second crossbar 11 transversally arranged between respective end portions of the side arms 12, 13.

The dimensions of the buckle frame 10, such as the length, width and thickness of the side arms 12, 13, the length and thickness of the connecting second crossbar 11, as well as the dimensions of the locking element 20 and of the cam 30, may be chosen to best fit an intended size of a load strap to be used and the anticipated load to withstand. For example, the cam buckle may be sized to accommodate a load strap of 25 mm, 35 mm, 45 mm or 50 mm in width. The buckle frame 10, locking element 20 and cam 30 may for example be made of a metallic material or hard plastic. The buckle frame may be manufactured as a single piece, for example by casting or moulding, or by joining separately manufactured side arms 12, 13 and second crossbar 11, for example by welding.

Figure 2:
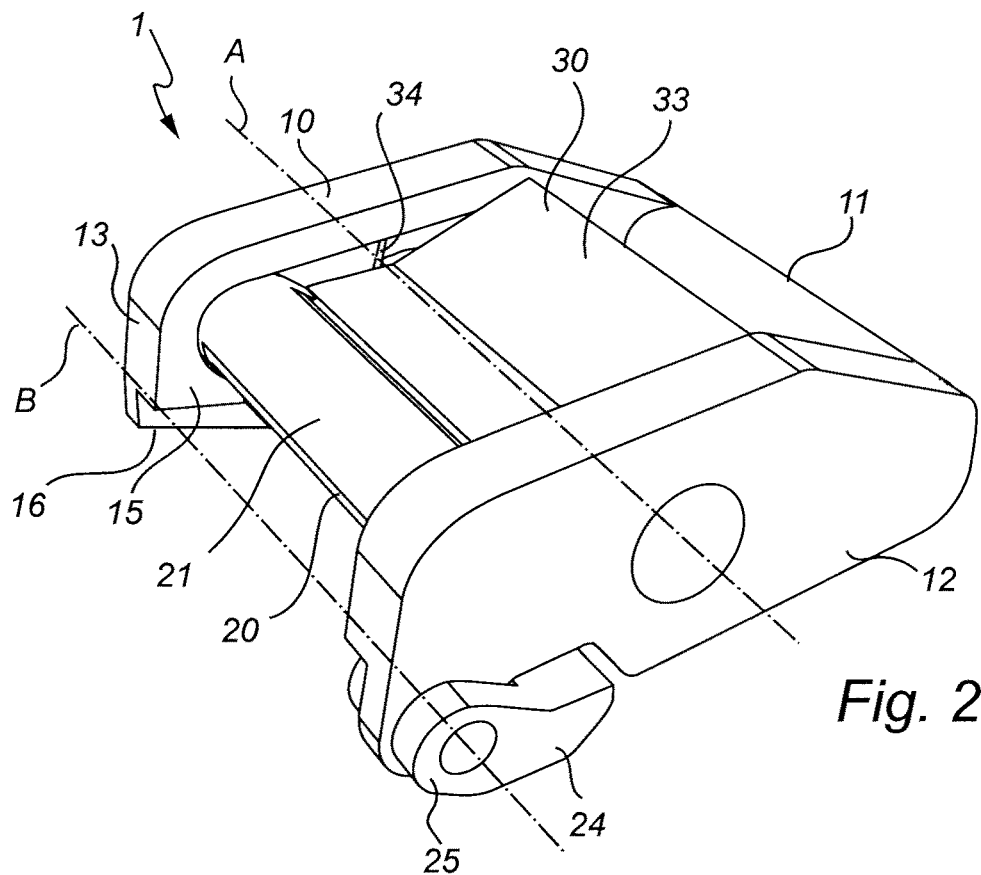
FIG. 2 shows in perspective view an embodiment of the cam buckle with the locking element in the closed position.
Figure 3:
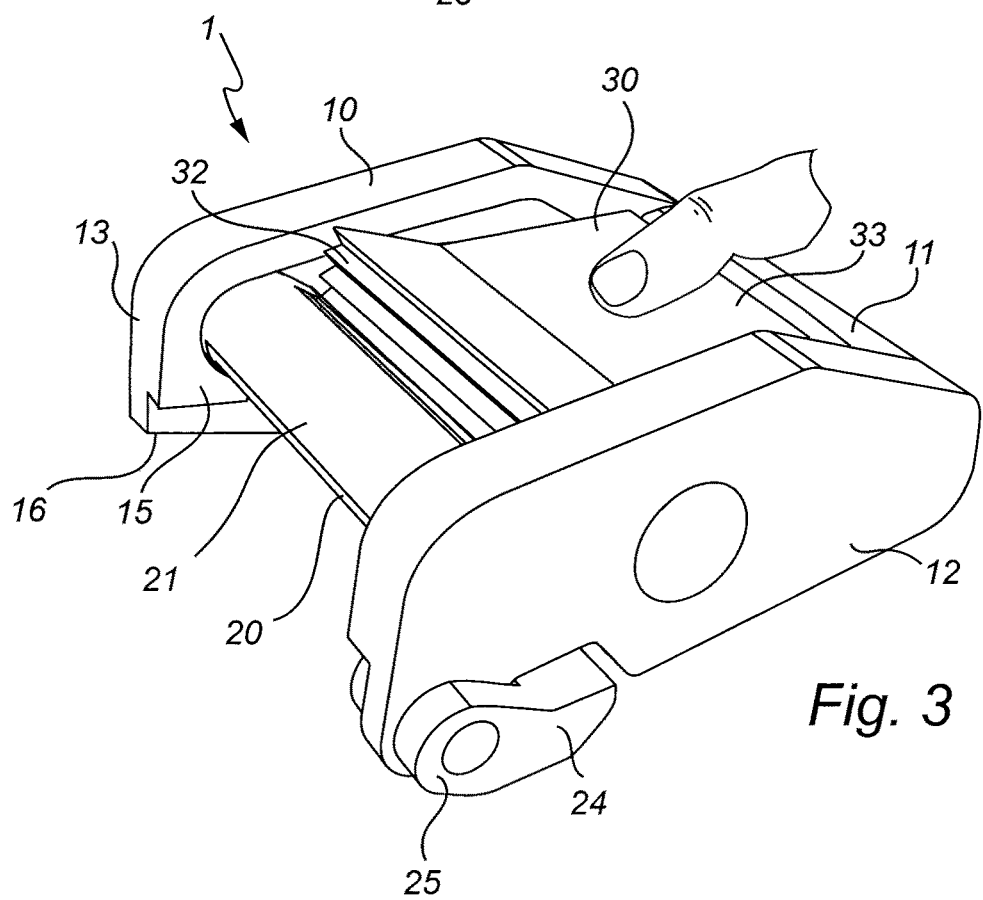
FIG. 3 shows in perspective view an embodiment of the cam buckle with the locking element in the closed position.

With reference to FIGS. 2 and 3, the cam 30 is pivotably connected to generally medial portions of the side arms 12, 13, with a pivot axis A parallel to the crossbars 11, 21 and perpendicular to the side arms 12, 13. The cam 30 is pivotable between a clamping position, shown in FIG. 2, and a release position, shown in FIG. 3. On one side of its pivot axis A, the cam 30 has a gripping portion 32, shown in FIG. 3. A biasing element 34, connected to the buckle frame 10 and to the cam 30, biases the cam 30 towards its clamping position, in which the gripping portion 32 is pushed against the crossbar 21. The gripping portion 32 of the cam 30 has a serrated structure formed by a plurality of parallel teeth extending along the gripping portion 32, parallel to the pivot axis A of the cam 30. Alternatively, the surface of the gripping portion 32 could for example be knurled. On the other side of its pivot axis A, the cam 30 has an actuating portion 33, configured to be pressed by a user to push the cam into its release position.

The locking element 20 is arranged with the crossbar 21 extending between the side arms 12, 13 at the opposite end portions of the side arms 12, 13 relative to the second crossbar 11. The locking element 20 has an attachment arm 24 extending perpendicular to the crossbar 21 between an end portion of the crossbar 21 and an attachment portion 25. The locking element is pivotably connected to one side arm 12 at the attachment portion 25, with a pivot axis B parallel to the crossbar 21. The end portion of the side arm 13 opposite the end portion of the side arm 12 to which the locking element is connected has a chamfered edge 16.

On the inside of each side arm 12, 13, a ledge 14, 15 extends along an edge of the side arm 12, 13 between the attachment portion 25 of the locking element 20 and the second crossbar 11. Closest to the locking element 20, the ledge 14, 15 has an arcuate shape, partly following the contour of the respective end portions of the crossbar 21.

Figure 5:
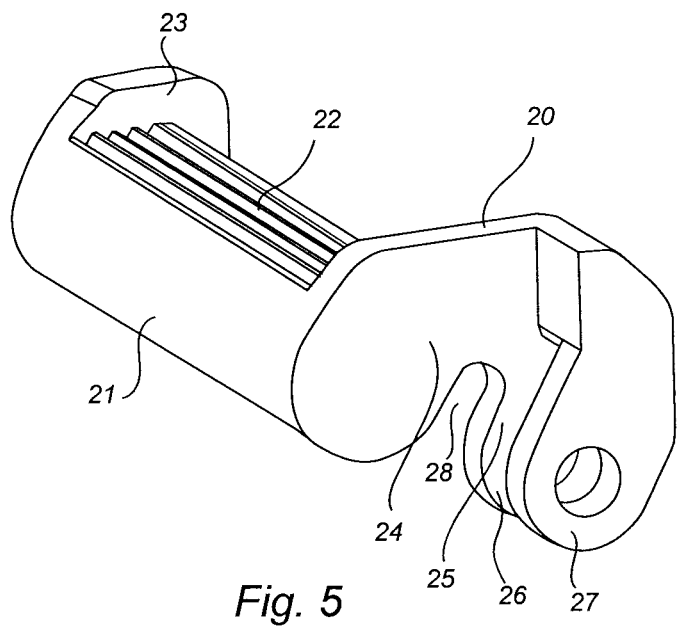
FIG. 5 shows in perspective view the locking element according to an embodiment of the cam buckle.

As shown in FIG. 5, the attachment arm 24 has a hook shape, creating a trough 28 aligned between the end portion of the crossbar 21 and the attachment portion 25. In FIGS. 2 and 3, the trough 28 accommodates part of the ledge 14 that follows the contour of the end portion of the crossbar 21. Further, the attachment portion 25 has two prongs 26, 27 straddling the side arm 12 to which the locking element 20 is connected. The locking element 20 may be connected to the side arm 12 by a riveted joint through the two prongs 26, 27 and the side arm 12, or by any appropriate joint allowing the locking element to pivot. The attachment portion 25 could alternatively comprise a single prong 26.

As further shown in FIG. 5, the crossbar 21 of the locking element 20 has an asymmetric cross-section, with a generally flat portion 22. The flat portion 22, Like the gripping portion 32 of the cam 30, this flat portion 22 of the crossbar 21 has a serrated structure formed by a plurality of parallel teeth extending along the crossbar 21 between end portions of the crossbar 21. In the cam buckle 1 as shown in FIG. 2, the flat portion 22 of the locking element 20 and the gripping portion 32 of the cam 30 are facing each other (and thus not visible in FIG. 2). The end portion of the crossbar 21 opposite the attachment arm 24 has an end cap 23.

The cam buckle 1 as shown in FIGS. 2 and 3 may be used as a traditional cam buckle. The actuating portion 33 of the cam 30 is pushed on by a finger of a user, in order to pivot the cam 30 toward its release position, as shown in FIG. 3. With the cam 30 in the release position, there is a clearance between the griping portion 32 and the crossbar 21. An end of a load strap may be inserted into this clearance and be freely moved. When the user releases the pressure on the actuating portion 33, the cam 30 returns to its clamping position thanks to the biasing element 34, and sandwiches the load strap between the gripping portion 32 and the crossbar 21. The load strap is then pulled through the cam buckle 1 until the slack in the strap is removed and a desired tension is created. The end of the load strap is inserted in the cam buckle 1 such that the pulling on the strap to remove slack occurs in a direction going from the clamping position to the release position of the cam 30. The tension in the strap pulls the gripping portion 32 of the cam 30 toward the crossbar 21, thus increasing the clamping force on the strap, securing it in place.

Figure 4:
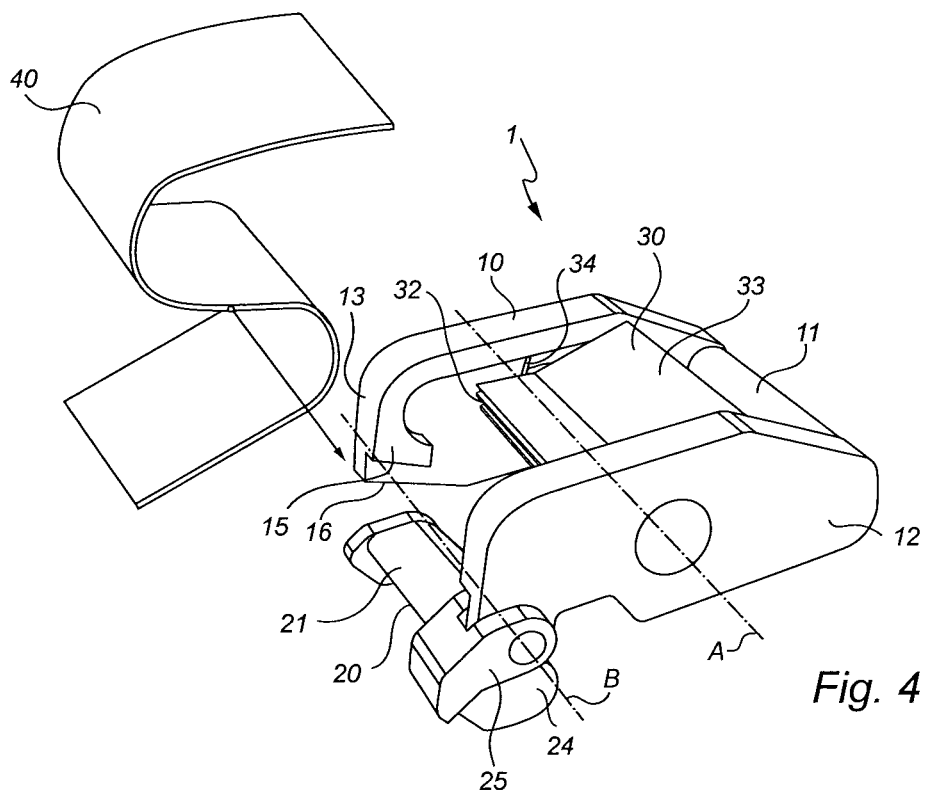
FIG. 4 shows in perspective view an embodiment of the cam buckle with the locking element in the open position.

The locking element 20 is pivotable between a closed position, shown in FIGS. 2 and 3, and an open position, shown in FIG. 4. When the locking element 20 is in the open position shown in FIG. 4, an opening is created between the crossbar 21 and one of the side arms 13. The opening allows a load strap 40 to be inserted laterally as illustrated by the arrow in FIG. 4. The chamfered edge 16 of the side arm 13 increases this opening, facilitating the insertion of the load strap 40. Subsequently, the locking element 20 is pushed back toward the closed position seen in FIG. 2, leaving the load strap 40 constrained laterally between the side arms 12, 13 and on the flat sides of the load straps by the crossbar 21 and the cam 30, respectively.

The ledge 14, 15 acts as an abutment for the locking element 20 when the locking element is in the closed position. The ledge 14, 15 thus restricts the locking element 20 from further pivoting about axis B once the locking element 20 has reached its closed position, when pivoting from the open position to the closed position of the locking element 20. Conversely, when the locking element 20 is in the closed position, the cam 30 restricts the locking element 20 from pivoting back about axis B toward the open position, as long as the cam 30 is in the clamping position shown in FIG. 2.

In other words, the locking element 20 in the closed position is locked in place by the ledge 14, 15 on one side and the cam 30 in clamping position on the other side, albeit with some clearance between the crossbar 21 and the cam 30 to accommodate a load strap therebetween. When the actuating portion of the cam 30 is pushed and the cam 30 pivots to its release position, as shown in FIG. 3, the locking element 20 is allowed to pivot from its closed position to its open position. In so doing, the crossbar 21 follows a path going first inward, toward the middle of the buckle 1, and away from the ledge 14, 15, until an opening is created between the crossbar 21 and the side arm 13 opposite the side arm 12 to which the locking element 20 is connected. Displacing the locking element 20 from the open position to the closed position only requires pushing on the crossbar 21 (or another part of the locking element 20) to pivot in the other direction. When the crossbar 21 comes into contact with the cam 30, it pushes the cam 30 to slightly pivot toward its release position until the locking element 20 is free to reach the closed position. The biasing element ensures that the cam 30 directly returns to the clamping position after passage of the crossbar 21. This quick movement of the cam 30 produces a click sound, indicating to the user that the locking element 20 is locked in place.

The ledge 14, 15 contributes to the strength of the buckle frame 1. Additionally, it allows for an effective transfer of load from the crossbar 21 to the buckle frame 1. As a load strap in tension pulls on the crossbar 21, the end portions of the crossbar 21 engage with the respective ledge 14, 15. In this way, the load is distributed substantially equally between the two side arms 12, 13. Advantageously, the strength of the cam buckle 1 is not only dependent on the strength of the joint between the buckle frame 10 and the locking element 21.

Figure 6:
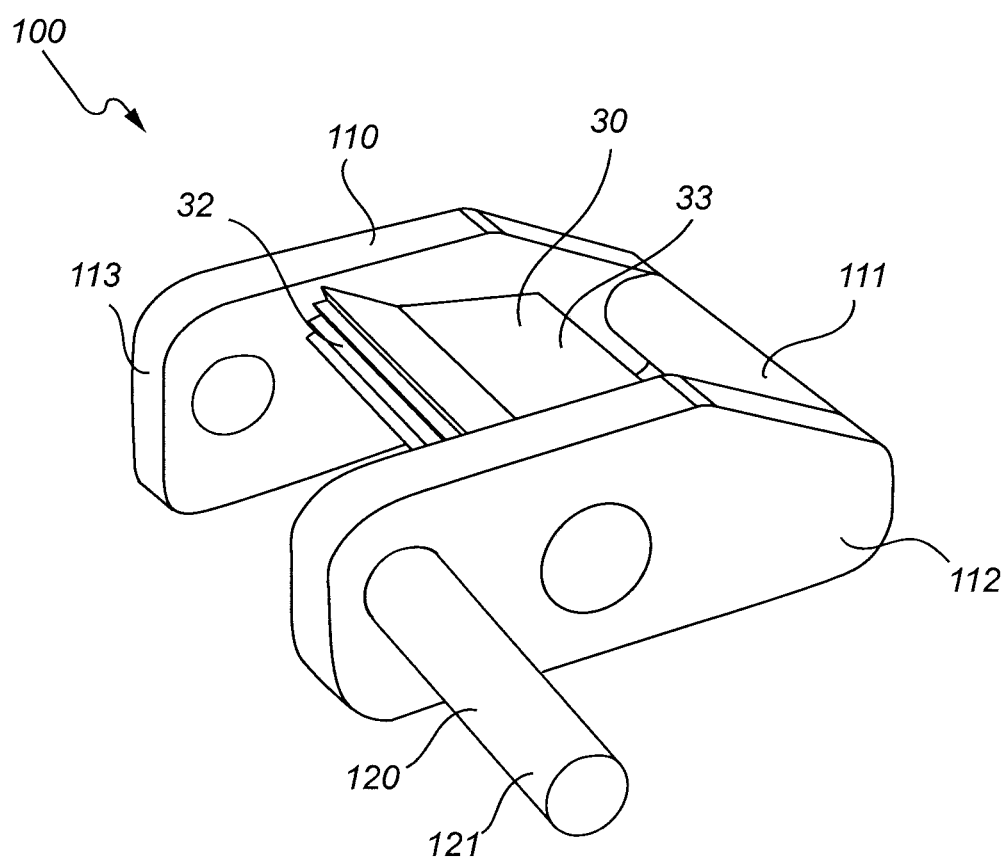
FIG. 6 shows in perspective view an alternative embodiment of the cam buckle.

FIG. 6 shows an alternative embodiment of the cam buckle 100. The cam buckle 100 comprises a pivotable cam 30 and a slidably displaceable locking element 120 forming a crossbar 121 connected to a U-shaped buckle frame 110. The buckle frame 110 is made of two side arms 112, 113 connected by a second crossbar 111. The two side arms 112, 113 are thin plates of similar dimensions, generally aligned and facing each other, with the second crossbar 111 transversally arranged between respective end portions of the side arms 112, 113.

The locking element is slidably displaceable between a closed position, in which the crossbar 121 extends between the two side arms 112, 113, and an open position, in which the crossbar 121 is separated from one side arm 113, as shown in FIG. 6. The displacement of the locking element occurs along the main axis of the crossbar 121, through an opening in the other side arm 112.

The cam 30 is pivotably connected to generally medial portions of the side arms 112, 113, with a pivot axis parallel to the crossbars 111, 121 and perpendicular to the side arms 112, 113. The cam 30 is pivotable between a clamping position and a release position. On one side of its pivot axis, the cam 30 has a gripping portion 32. A biasing element, connected to the buckle frame 110 and to the cam 30, biases the cam 30 towards its clamping position, in which the gripping portion 32 is pushed against the crossbar 121, when the crossbar 121 is in the closed position of the locking element 120.

When the locking element 120 is in the closed position, the cam buckle 100 may be used as a traditional cam buckle, in the same way as the cam buckle 1 described in FIGS. 2 and 3. When the locking element 120 is in the open position as shown in FIG. 6, an opening is created between the crossbar 121 and one of the side arms 113. The opening allows a load strap to be inserted in the cam buckle 100 without having to thread an end of the load strap between the crossbar 121 and the cam 30. The locking element 120 is subsequently returned to its closed position, leaving the load strap constrained laterally between the side arms 112, 113 and on the flat sides of the load straps by the crossbar 121 and the cam 30, respectively.

The skilled person in the art realizes that the present invention by no means is limited to the embodiments described above. The features of the described embodiments may be combined in different ways, and many modifications and variations are possible within the scope of the appended claims. In the claims, any reference signs placed in parentheses shall not be construed as limiting to the claim. The word "comprising" does not exclude the presence of other elements than those listed in the claim. The word "a" or "an" preceding an element does not exclude the presence of a plurality of such elements.

The invention claimed is:

1. A buckle for fastening a load strap, comprising:
   a buckle frame having two substantially parallel side arms,
   a crossbar extending between said side arms along a main axis, the main axis being substantially perpendicular to the side arms,
   a cam arranged between the side arms, the cam being pivotable between a clamping position, in which a load strap inserted between a gripping portion of the cam and the crossbar is clamped, and a release position, in which a clearance between the gripping portion and the crossbar is increased,
   wherein
   the crossbar forms part of a locking element, which is displaceable between a closed position, in which the crossbar extends between the side arms such that a load strap positioned between the cam and the crossbar is laterally constrained by the side arms, and an open position, in which the crossbar is separated from at least one of the side arms, such that a load strap is laterally insertable between the cam and the crossbar, and
   the locking element is displaceable such that the main axis of the crossbar remains perpendicular to the side arms during a displacement between the closed position and the open position of the locking element,
   wherein
   the locking element is pivotably connected to one of said side arms and pivotably displaceable between the closed position and the open position of the locking element.

2. The buckle according to claim 1, wherein the locking element further comprises an attachment arm extending between an end portion of the crossbar and an attachment portion pivotably connected to a side arm of the buckle frame, such that the pivot axis of the locking element is parallel to but offset with respect to the main axis of the crossbar.

3. The buckle according to claim 1, wherein each side arm comprises an abutment adapted to engage a respective end portion of the crossbar, in the closed position of the locking element, and wherein the locking element is locked in the closed position by the cam when the cam is in the clamping position.

4. The buckle according to claim 1, further comprising a biasing element, biasing the cam toward the clamping position.

5. The buckle according to claim 1, wherein the buckle frame further comprises a second crossbar fixedly connecting the side arms of the buckle frame, the second crossbar forming an anchor for attaching one end of a load strap.

6. A buckle for fastening a load strap, comprising:
- a buckle frame having two substantially parallel side arms,
- a crossbar extending between said side arms along a main axis, the main axis being substantially perpendicular to the side arms,
- a cam arranged between the side arms, the cam being pivotable between a clamping position, in which a load strap inserted between a gripping portion of the cam and the crossbar is clamped, and a release position, in which a clearance between the gripping portion and the crossbar is increased, wherein the crossbar forms part of a locking element, which is displaceable between a closed position, in which the crossbar extends between the side arms such that a load strap positioned between the cam and the crossbar is laterally constrained by the side arms, and an open position, in which the crossbar is separated from at least one of the side arms, such that a load strap is laterally insertable between the cam and the crossbar, and the locking element is displaceable such that the main axis of the crossbar remains perpendicular to the side arms during a displacement between the closed position and the open position of the locking element, wherein the locking element is displaceable by translation along a direction perpendicular to the main axis of the crossbar.

* * * * *